Feb. 26, 1952

C. E. GREENE 2,587,312

TURRET LATHE

Filed Jan. 23, 1946

INVENTOR
CLAUDE E. GREENE
BY
*Toulmin & Toulmin*
ATTORNEYS

INVENTOR
CLAUDE E. GREENE

Feb. 26, 1952     C. E. GREENE     2,587,312
TURRET LATHE Filed Jan. 23, 1946     7 Sheets-Sheet 3

INVENTOR
CLAUDE E. GREENE
BY
*Toulmin & Toulmin*
ATTORNEYS

Feb. 26, 1952        C. E. GREENE        2,587,312
TURRET LATHE Filed Jan. 23, 1946                                7 Sheets-Sheet 5

INVENTOR
CLAUDE E. GREENE
BY
Toulmin & Toulmin
ATTORNEYS

Feb. 26, 1952     C. E. GREENE     2,587,312
TURRET LATHE Filed Jan. 23, 1946     7 Sheets-Sheet 6

INVENTOR
CLAUDE E. GREENE
BY
Toulmin & Toulmin
ATTORNEYS

Feb. 26, 1952     C. E. GREENE     2,587,312
TURRET LATHE Filed Jan. 23, 1946     7 Sheets-Sheet 7

INVENTOR
CLAUDE E. GREENE
BY
*Toulmin & Toulmin*
ATTORNEYS

Patented Feb. 26, 1952

2,587,312

UNITED STATES PATENT OFFICE 2,587,312

TURRET LATHE

Claude E. Greene, Sidney, Ohio, assignor to The Monarch Machine Tool Company, Sidney, Ohio, a corporation of Ohio Application January 23, 1946, Serial No. 642,906

4 Claims. (Cl. 29—64)

This invention relates to machine tools and methods of operating the same and particularly to machine tools employing a plurality of cutting members such as is done in a turret lathe.

In a turret type machine tool there is generally provided a turret which mounts a plurality of cutting tools that are successively presented to a workpiece secured in a rotatable spindle. The tools usually employed represent several different types of metal cutting devices such as drills, counterbores, reamers, taps, etc.

For the efficient machining of a workpiece by each of the tools referred to above, there is an optimum feeding and cutting speed from which the best results are obtained. The adjustment of the feed of the tool into the work and the speed of rotation of the work is generally accomplished by a variable speed transmission which may include gearing or hydraulic means according to the individual preference. Such devices, however, involve considerable expense, many moving parts, and are difficult to adjust automatically.

Accordingly, the primary object of the present invention is to provide an improved mechanism in a multi-tool machine tool for adjusting the relative speeds of the workpiece and the said tools.

Another object is to provide a control system for a multi-tool machine wherein independent and separately adjustable cutting speeds may be had for each tool.

Still another object is to provide a control system for a turret type machine tool having a plurality of cutting tools which provides separate and independently adjustable speeds of both the workpiece holding spindle and of the tool feeding mechanism.

Still another object is to provide a control system for a turret lathe in which the spindle speed is automatically determined for each tool presented thereto, and in which the speed of feeding the tool both toward and away from the work is also separately and independently adjustable.

It is still another object to provide a control system for the spindle drive motor in a turret lathe and also for the motor which feeds the tools in which a wide range of speeds is available by means of relatively small adjusting units.

It is also an object of the present invention to provide a turret lathe having separate electric motors for driving the spindle and for reciprocating the turret in which the speed of operation of the said motors is separately and independently adjustable for each tool by means of relatively small rheostats.

These and other objects and advantages become more apparent upon reference to the following specification taken together with the accompanying drawings in which.

General arrangement

According to this invention a machine tool is constructed having a rotatable spindle and a turret carrying a plurality of tools which is reciprocable to and from said spindle while being indexed selectively to present the tools carried thereby to the workpiece supported in the spindle.

The spindle is driven from an electric motor and the drive between the motor and spindle may include suitable change gearing as desired. According to one form of the invention, a feed rod is driven from the spindle drive mechanism and is selectively engageable with the turret operating mechanism for power driving the turret. For supplying electric power to the spindle drive motor there is provided a motor generator set, the motor of which is connected with suitable power lines and the generator armature is connected with the spindle drive motor armature through a portion of the control circuit of this invention.

In order to vary the speed of the spindle drive motor to vary the speed of the spindle and the feed of the turret, the motor and generator fields are variable through a control system which includes electronic tubes the discharge of which is controlled through a phase shift network employing small rheostats. By varying the strength of the motor field and thereafter varying the strength of the generator field, a wide range of operating speeds of the motor may be had. The several operating speeds are selected by a suitable stepping switch which connects one after the other of the aforementioned small adjustable resistors into the phase shift network that controls the supply of power to the said fields. This switch may be actuated manually or automatically in response to the reciprocation of the tool carrying turret.

According to another form of this invention the spindle and feed rod are driven by separate motors, each of which is supplied by a separate generator and each generator and motor are interconnected and have their fields controlled by a control circuit according to this invention. Where a plurality of motors and generators therefor are utilized, their operation is synchronized by providing a single switch means to actuate all of the stepping switches employed in the several control circuits.

Structural arrangement

Referring to Figures 1 through 5, a turret lathe constructed to be operated according to this invention generally comprises a bed 10 having mounted thereon a headstock mechanism generally indicated at 12. Also carried on the bed 10, as by means of the intermediate bed 14 is a tool holding mechanism generally indicated at 16 that comprises the turret 18, turret slide 20 and turret slide bed 22. For performing cut-off operations and the like, there may also be mounted on the intermediate bed 14 a manually operated cross slide at 24.

Figure 1:
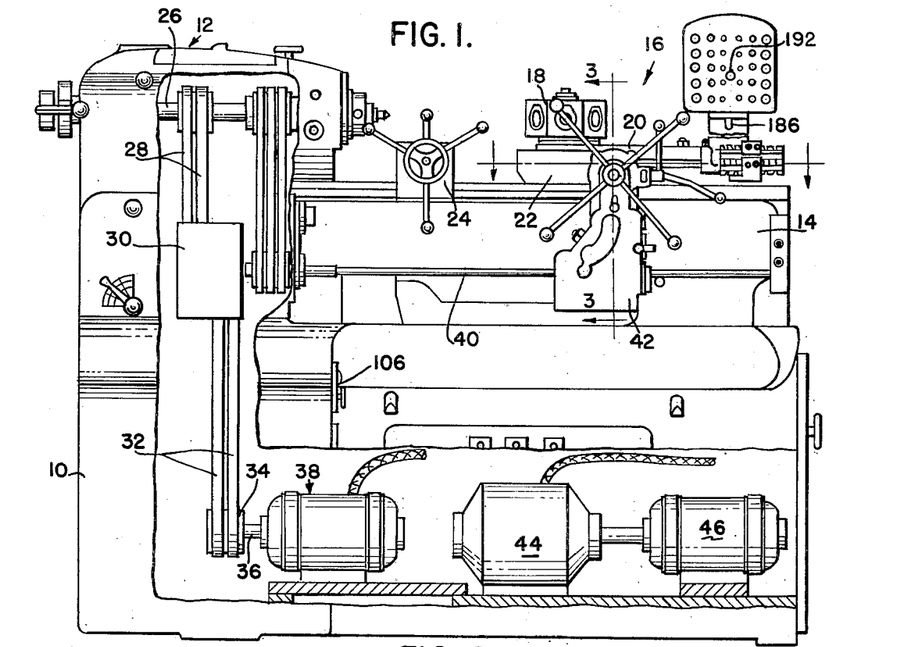
Figure 1 is a side elevation, partly broken away, of a turret lathe constructed according to, and adapted for practicing the methods of, this invention.

The headstock 12 includes a spindle 26 that may be driven by the belts 28 from an adjustable transmission 30 which, in turn, is driven by the belts 32 that run over the pulleys 34 on the output shaft 36 of a motor indicated at 38.

Arranged to be driven from the spindle, or from the spindle through suitable change gearing, or from the transmission at 30 is a feed rod 40 that passes through the apron 42 connected with the turret slide bed 22.

Also mounted in the bed 10 is a generator 44 which is driven by a drive motor 46, the latter being connected with suitable power lines and preferably comprising any standard constant speed motor. The output from the generator is connected to be delivered to the motor in one direction or the other depending on the direction of rotation of the motor desired. The generator field is varied to vary the generator output and the motor field is varied to vary the speed to which the motor will run in connection with the varying output supplied thereto from the generator.

According to this invention, the motor speed is varied between wide limits by adjusting the generator and motor fields and, therefore the spindle and feed rod speeds may also be varied between wide limits for varying the cutting speed and feed of the tools.

Turret and actuating mechanism therefor

Figures 3, 5:
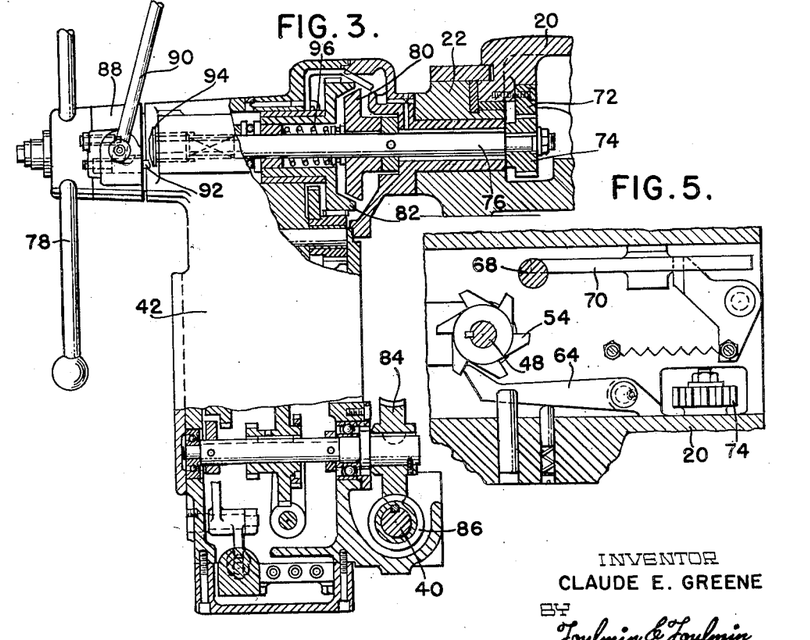
Figure 3 is a fragmentary vertical section through the turret driving mechanism and is indicated by the line 3—3 on Figure 1.
Figure 5 is a fragmentary plan section indicated by the line 5—5 on Figure 4 and showing the turret indexing mechanism.
Figure 4:
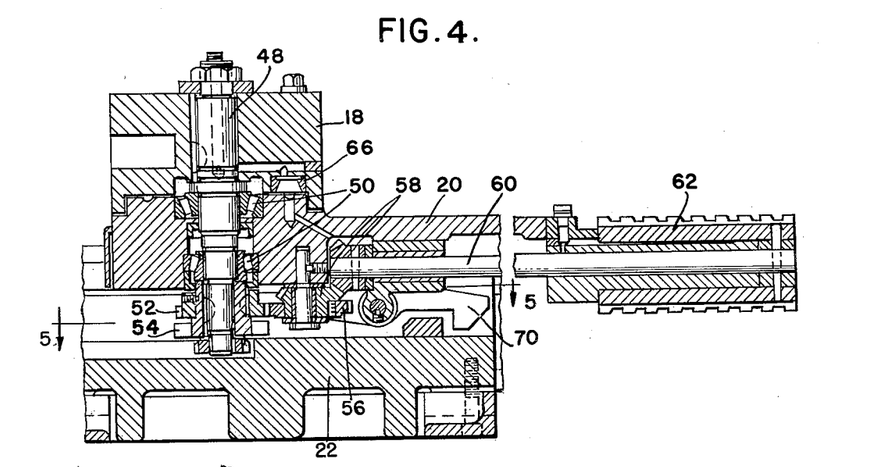
Figure 4 is a vertical longitudinal section through the turret and its operating mechanism and is indicated by the line 4—4 on Figure 2.

In Figures 3, 4 and 5, the turret and mechanism for reciprocating and actuating the same is better shown.

As mentioned before, the turret 18 is mounted on a slide 20 which slides on a bed 22. On reference to Figure 4, it will be noted that there is keyed to the turret a shaft 48 that is journalled in the slide 20 on anti-friction bearings such as are indicated at 50 and which extends into a recess in the bed 22 to be connected therein with the gear 52 and ratchet wheel 54. The gear 52 meshes with a second and equal sized gear 56 that drives into one of a pair of mitre gears 58, the other of which is connected with a rod 60 that extends rearwardly through the slide 20. Connected with the rod 60 externally of the rod 20 is a tail rod 62 which carries cams for a purpose to be explained hereinafter.

The ratchet wheel 54, better seen in Figure 5, is adapted for engagement with an arm 64 when the turret is retracted so that during the retracting movement of the slide 20 the turret 18 is indexed into its next operative position. The turret 18 preferably comprises a plurality of recesses that receive the locking bushings 66 that are adapted for engagment by a reciprocable locking pin 68 so that the turret is accurately locked in each of its positions. During the retraction of the slide 20 and arm 70 pivoted in the said slide retracts the pin 68 so that the arm 64 and ratchet wheel 54 may properly index the turret. When the slide is fully retracted the arm 70 permits the pin 68 again to fall into a locking bushing and thereafter the turret remains locked in place until the slide is again retracted.

The slide 20 is driven in reciprocation on its bed 22 by a rack 72 carried on the slide and a pinion 74 mounted on a shaft 76 that extends transversely through the apron 42. The shaft 76 is adapted for actuation by a handwheel 78 secured to the outer end thereof or through a clutch member 80 fastened to the shaft within the apron. The member 80 is engageable by a second clutch member 82 that is driven through a gear train from the worm wheel 84 disposed immediately above the feed rod 40. The worm wheel 84 is driven by a worm gear 86 that is slidably keyed to the feed rod and which reciprocates with the apron 42 when the latter is moved. According to the usual practice in the art, the apron 42 may comprise change gears for selecting predetermined speed ratios between the shaft 76 and the feed rod 40.

Figure 2:
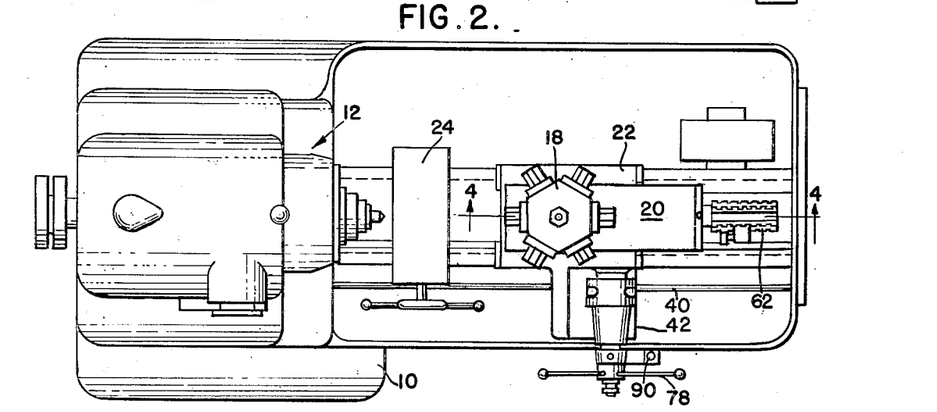
Figure 2 is a plan view taken over the machine of Figure 1.

For engaging the clutch members 80 and 82, there is provided a sleeve 88 that is rotatable by a lever 90 to urge the said members together. When the members are engaged, a spring pressed plunger 92 on the sleeve 88 falls into a bore in a bushing 94 carried by the apron. The plunger remains in the said bore and thus retains the clutch members engaged until a cam carried by the tail rod 62, as shown in Figure 2, engages a means for dislodging the said pin from the bore in the bushing 94. When the pin and bore are disengaged, a spring 96 urges the clutch members apart and the power drive to the turret slide is interrupted. Thereafter the turret slide is moved to its retracted position manually. The slide is also moved into working position manually and the power drive is employed only while the work is being shaped.

*Energizing circuit for drive motor 46*

Figure 6:
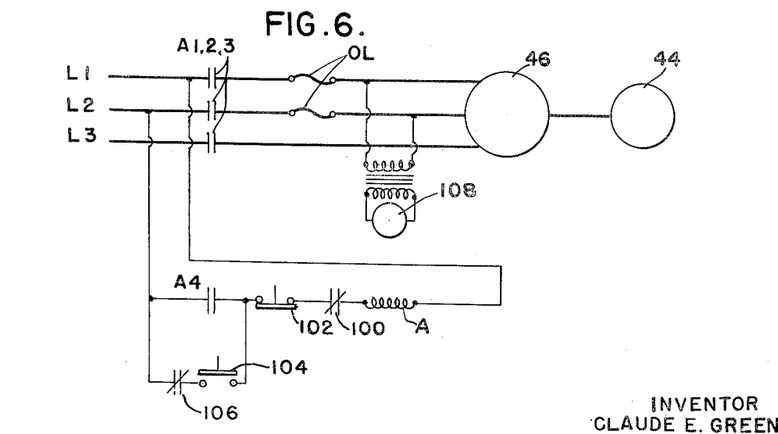
Figure 6 is an electrical diagram of the circuit to the main drive motor which drives the generating means for supplying power to the lathe drive motors.

Figure 6 illustrates the circuit for energizing the drive motor 46 which is connected with the generator 44. In Figure 6 the power lines L1, L2 and L3 are connected with the terminals of the motor 46 through the normally open blades A1, A2 and A3. Between the lines L1 and L2, ahead of the blades A1 and A2, is connected a circuit which includes the coil A, the normally closed overload blades at 100, the stop switch at 102, the normally open starting switch at 104 and the snap switch indicated at 106. The starting switch and snap switch are bypassed by a line that includes the normally open blades A4. The snap switch is mounted on the bed 10 and, when opened, prevents energization of the drive motor 46. The normally closed blades 100 are operated into an open position by the overload relay mechanism generally indicated at OL in the lines L1 and L2. Optionally, there may be connected between two of the terminals of the drive motor a signal device at 108 which indicates whether or not the drive motor is energizing.

*Generator and motor armature circuits*

Figure 7:
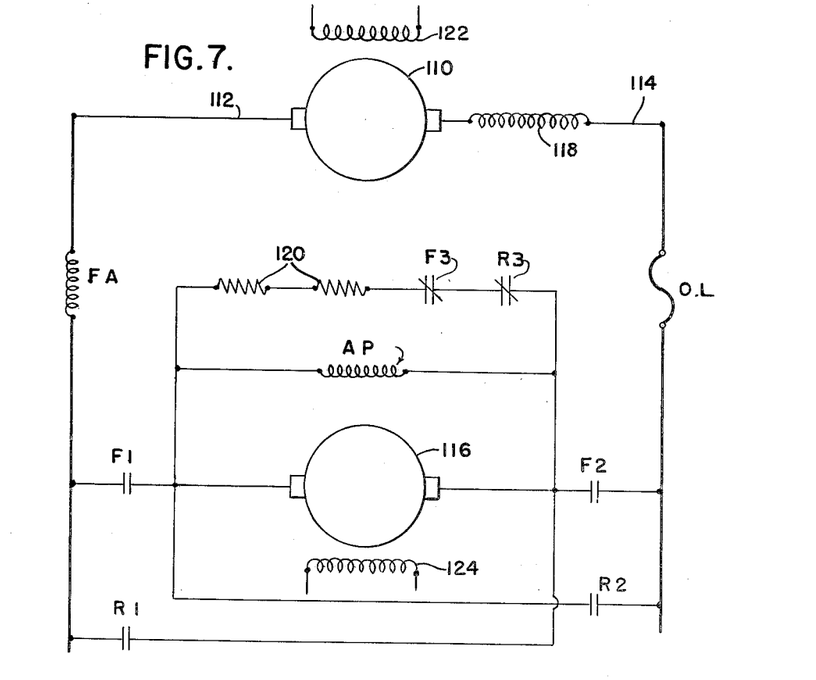
Figure 7 is the diagram of the connection between the generator armature and the motor armature.

Figure 7 illustrates the manner in which the generator and motor armatures are interconnected. In this view the generator armature at 110 is connected through the wires 112 and 114 with the motor armature 116. The wire 114 includes the generator series field 118 and the wire 112 includes a coil indicated at FA, the purpose of which will be explained hereinafter.

For reversing the direction of current through the motor armature for reversing the direction of rotation of the motor, there are provided the normally opened contactor blades F1 and F2 which, when closed, connect the armatures to drive the motor in a forward direction and the normally opened blades R1 and R2 which, when closed, connect the armature to drive the motor armature in a reversed direction.

Shunted across the terminals of the motor armature is a line including a coil indicated at AP and a second line including the resistors 120 and the serially connected normally closed blades F3 and R3. The branch line including the resistors and normally closed blades is for the purpose of dynamically breaking the motor armature when the speed thereof is to be reduced and the branch including the coil AP is for the purpose of eliminating surges in the armature circuit.

Associated with the generator armature is a main field coil 122 and associated with the motor armature is a main field winding 124. The aforementioned field windings are variable supplied with power from an independent circuit which is shown in Figure 8.

*Motor and generator field supply circuits*

Figure 8:
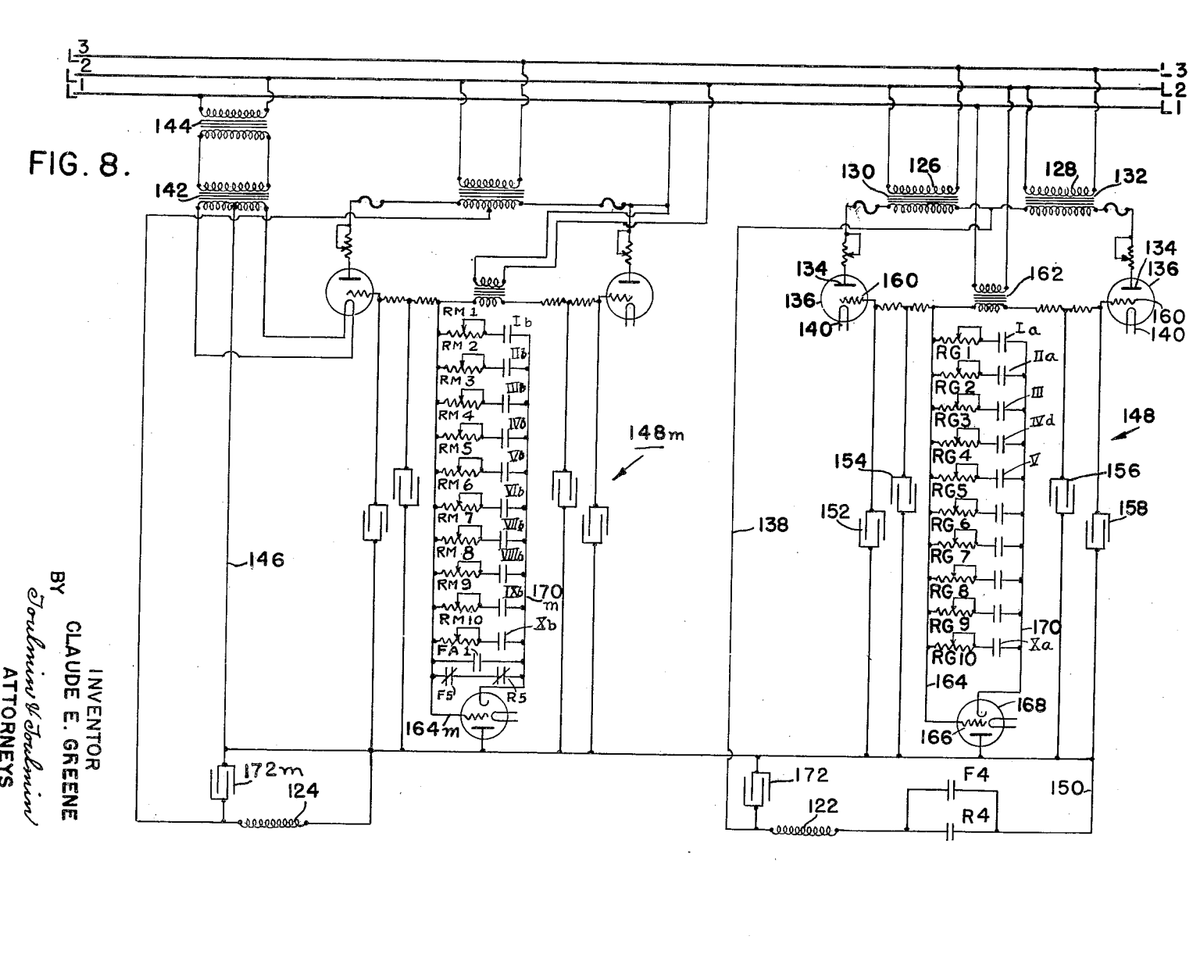
Figure 8 is an electrical diagram showing the generator and motor field supply circuits and adjusting means therefor.

Figure 8 illustrates the circuit which supplies electrical energy to the motor and generator main field coils. In this figure, there are the three-phase power lines L1, L2 and L3, and connected between the lines L2 and L3 are the primaries 126 and 128 of the transformers 130 and 132. The secondaries of the transformers 130 and 132 are connected in series and their opposite ends are connected with the plates 134 of a pair of thyratron tubes 136.

The other ends of the transformer secondary are connected together and are joined by a wire 138 with one end of the generator field 122.

The tubes 136 include a cathode 140 which is supplied with current from a cathode transformer 142 which may be connected to be supplied with energy from an intermediate transformer 144 that is supplied from the aforementioned power lines. The intermediate transformer electrically isolates the cathodes and plates of the tubes 136. The secondary of the cathode heating transformer 142 is center tapped by a wire 146 which leads to one side of a phase shift network associated with the tubes 136 and indicated generally at 148. The wire 146 also connects a wire 150 through the paralleled and normally opened blades F4 and R4 with the other end of the generator field coil 122.

The aforementioned phase shift network comprises the condensers 152, 154, 156 and 158 which have one terminal connected with a wire 146. The other terminals of the condensers 152 and 158 are connected with the grids 160 of the tubes 136 and, through biasing resistors with the other terminals of the condensers 154 and 156 respectively.

The said other terminals of the condensers 154 and 156 are connected together through biasing resistors and the secondary of a transformer 162 which supplies voltage to the phase shift network for biasing the tubes 136. The primary of the transformer 162 is connected between the power lines L1 and L2.

For shifting the phase of the network 148 for variably biasing the tubes 136, there is connected between one end of the secondary of the transformer 162 and the wire 146 a wire 164 that leads to the grid 166 of a tube 168. The cathode of the tube 168 is connected with a wire 170 and connected between the wires 164 and 170 are a plurality of adjustable resistors each having normally open contact blades in series therewith. The plate of the tube 168 is connected with the wire 146 for completing the circuit. By connecting various resistors between the cathode and grid of the plate 168, the amount of current passed thereby may be varied and the phase angle of the biasing voltage applied to the grids 160 varied in order to control the firing of the tubes 136. By properly selecting values for the resistors and condensers in the phase shift network, the biasing voltage applied to the grids of the tubes 136 may be adusted from in phase with the plate voltage thereof to 180° out of phase. Thus, the firing of the tubes 136 may be controlled from zero discharge to full discharge.

The aforementioned adjustable resistors, of which there are ten, are indicated at RG1 to RG10. The contact blades in series with the several resistors are indicated at IA through XA. The relay which operates the several contact blades forms another part of the control circuit and will be explained hereinafter in connection with Figures 10 to 13.

The circuit through the generator field, commencing with the end of the wire 138 between the secondaries of the transformers 130 and 132 is through the wire 138, through the field 122, through the wire 150, thence through the wire 146 to the center tap of the secondary of the transformer 142. Thereafter the current passes to the cathodes 140 of the tubes 136 and then to the plates thereof and the circuit is finally completed through the connections of the said plates with the secondary of the transformers 130 and 132. For the purpose of filtering out fluctuations in the voltage supplied to the field 122, there may be provided the condensers 172 connected between wires 138 and 146.

The circuit for supplying the motor field 124 is substantially identical with that which has been described in connection with the generator field 122 and similar parts are indicated by similar numerals with a subscript $m$ except for differences which will now be explained.

The principal difference between the generator and motor field supply circuits lies in the fact that under certain conditions it is desired to supply maximum energy to the motor field temporarily. These conditions occur when the speed of the motor is to undergo a considerable change or when the motor is to be reversed. In either of these conditions, it is desirable to eliminate or reduce surges in the armature circuit of Figure 7. To this end, there is connected between the wires 170m and 164m a line which includes the normally open blades FA1 which are operated into a closed position in response to a predetermined current to the coil FA in the line 112 of Figure 7. Then, in response to a predetermined minimum surge current passing between the generator and motor armatures, the blades FA1 are closed and the phase shift network 148m is adjusted to supply maximum current to the motor field 124 thereby limiting the aforementioned surge current.

Also connected between the lines 170m and 164m are the serially arranged and normally closed blades F5 and R5. The blades F5 and R5 are both closed to produce an effect similar to the closing of the blades FA1 in response to a predetermined current passing through the coil AP, indicated in Figure 7 as shunted across the terminals of the motor armature 116. The particular manner in which this is accomplished will become more apparent in connection with the description of Figure 10.

In order to distinguish the resistors in the phase shift network 148m from those in the network 148, those in the former are indicated as RM1 to RM10. The contact blades in series with these resistors are indicated as Ib to Xb.

Figures 9, 17, 18, 19, 20:
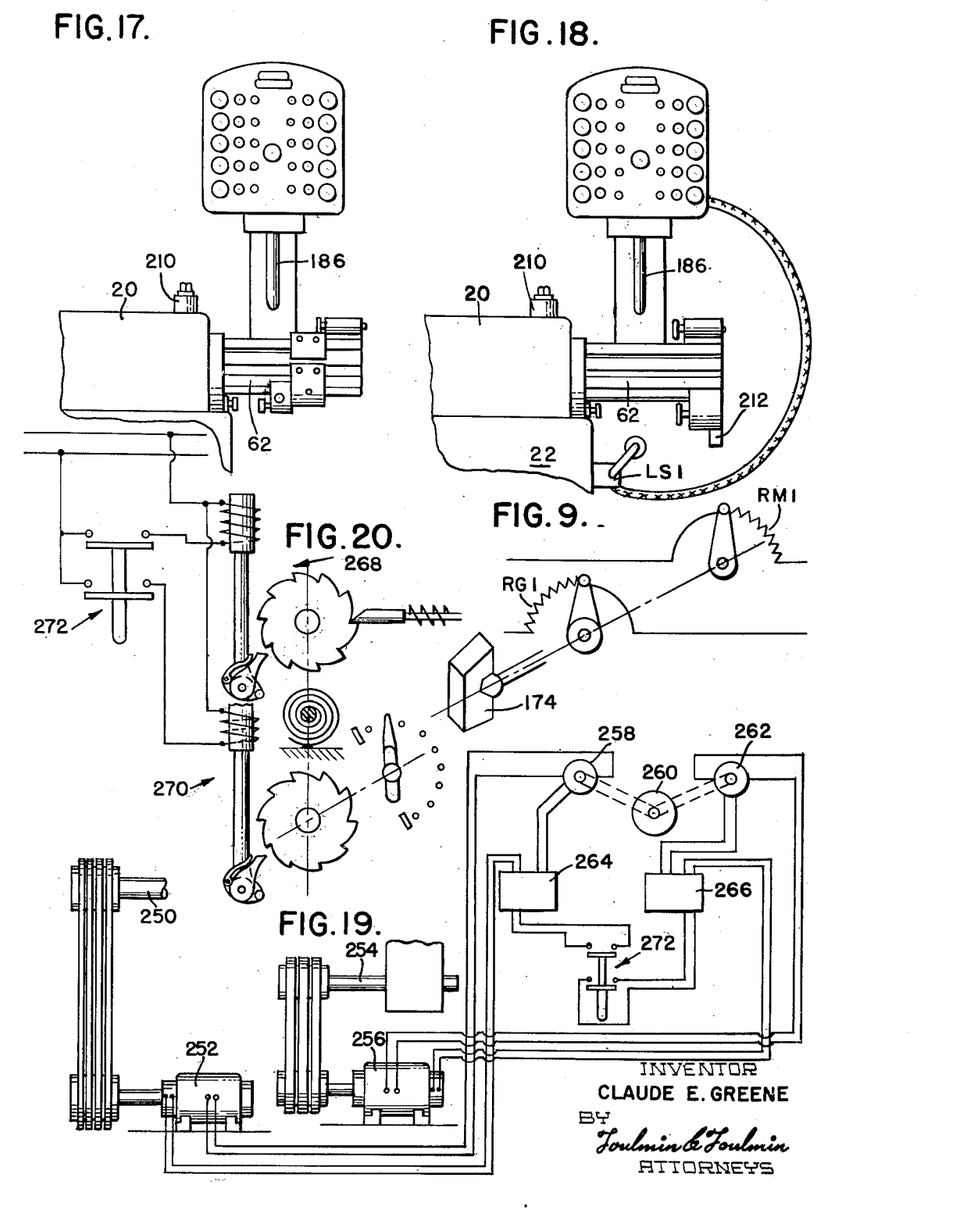
Figure 9 is a view showing the differential double bank rheostat which inversely adjusts the supply of power to the motor and generator fields.
Figure 17 is a fragmentary view showing mechanism for automatically selecting the next speed by the retraction of the turret.
Figure 18 is a fragmentary view showing how a limit switch may be located to be engaged by the turret mechanism for selecting a predetermined retracting speed of the tool from the work.
Figure 19 is a diagrammatic view illustrating how the present invention may be adapted to the control of both the spindle speed and tool feeding motor speed in a turret lathe.
Figure 20 is a diagrammatic view illustrating how a pair of stepping switches may be arranged for use in connection with the control system of Figure 19.

The adjustable resistors RG and RM are mechanically interconnected so that corresponding pairs thereof are simultaneously adjusted. This is indicated in Figure 9 wherein RG1 and RM1 are shown with their arms connected to a shaft to be adjusted by a single knob 174. Preferably, the resistors are arranged so that rotation of the knob will first completely adjust one and thereafter adjust the other. Then, in order continuously to adjust the motor speed, say, downwardly, the resistor RM1 is gradually cut out of the circuit to increase the motor field and thereafter the resistor RG1 is gradually cut into the circuit to reduce the generator field.

*Circuit for actuating forward and reverse relays*

Figures 10 through 13 illustrate the circuit for actuating the forward and reverse relays and the switch which actuates the contacts in series with the adjustable resistors of the phase shift networks.

Figures 10, 11, 13:
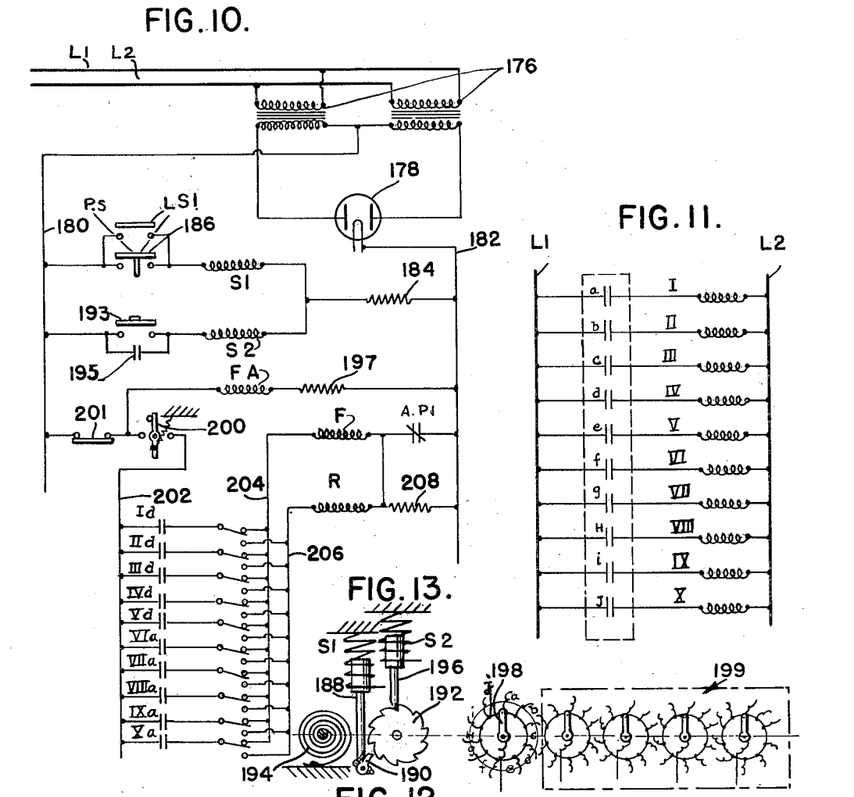
Figure 10 is a diagram of a portion of the electrical control circuit for actuating the contact blades in the circuits of Figures 7 and 8.
Figure 11 is a view of the circuit to the relay coils which are controlled by the circuit of Figure 10.
Figure 13 is a diagram illustrating a stepping switch controlled by the circuit of Figure 9.

In Figure 10, there is a power supply means connected between the lines L1 and L2 and comprising transformers 176 and a rectifier tube 178 adapted for supplying direct current to the wires 180 and 182. Connected between the wires 180 and 182 is a solenoid S1 in series with a resistor 184 and also in series with a switch 186 which is paralleled by a limit switch LS1, the said switches being normally open.

On reference to Figure 13, it will be noted that the solenoid S1 is arranged to actuate an armature 188 that carries a pawl 190 that engages the teeth of a ratchet wheel 192. The ratchet wheel 192 is continuously urged in a counterclockwise direction by a torsion spring 194 and is retained in each operative position by a spring loaded plunger 196 that may be retracted by energization of a solenoid S2. Connected with the shaft of the ratchet wheel 192 is a contact arm 198 adapted for successively contacting, the contacts indicated at $a$ through $j$.

Figure 12:
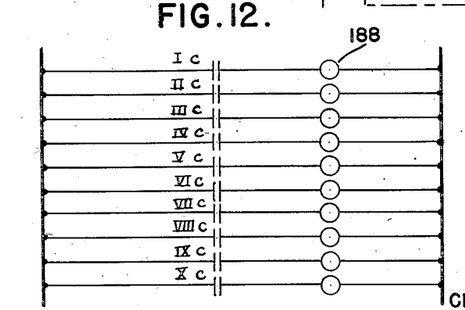
Figure 12 is another portion of the electrical circuit showing the indicating lights which inform the operator of the exact condition of the control circuit.

In Figure 11, it will be noted that between the lines L1 and L2 there are connected the relay coils I through X, and in series therewith the contacts $a$ through $j$ respectively. Thus, in each position of the ratchet wheel 192 one of the contacts $a$ through $j$ is closed and one of the coils I through X is also closed. The coils I through X operate the contacts shown in Figure 8 at Ia through Xa and Ib through Xb. In addition, these coils operate the contacts Ic through Xc which, as shown in Figure 12 are connected to energize signal lights as at 188 for indicating to the operator the exact position of the cycle in which the machine is operating.

The coils I through X also operate the blades Id through Xd which select between the forward and reverse relays in a manner to be more fully explained in connection with Figure 10.

Optionally, the shaft of the ratchet wheel 192 may actuate a plurality of contact arms as indicated at 199 each having associated therewith an independent contact bank which comprise the aforementioned contacts associated with the coils I through X.

Returning to Figure 10, there is also connected between the wire 180 and the wire 182 through the resistor 184 the rheostat solenoid S2 which is also in series with a normally open push button switch 193 which may be bypassed by a pair of normally open blades 195 that are closed in response to a predetermined position on the ratchet wheel 192 for accomplishing the resetting of the circuit.

Also connected between the wires 180 and 182 through a resistor 197 in a second coil FA which is associated with the coil FA of Figure 7. The coils FA are wound on a common core and are additive so that the coil FA in the armature circuit of Figure 7 need be only a relatively few turns so that there is little power loss associated therewith.

The wire 180 is also connected through an overload switch blade 201 with one terminal of a snap switch 200 that is mounted on the headstock as indicated in Figure 1. When the snap switch is closed a circuit is completed through a wire 202 that connects with one side of the blades Id through Xd. The other sides of the contacts Id through Xd are each connected with a selector switch selectively movable to make contact with a wire 204 or with a wire 206.

The wire 204 connects to one end of the forward relay F while the wire 206 connects with one end of the reverse relay R, the other ends of the said relays being connected together. The other ends of the relays are also connected through a resistor 208 with the wire 182 and through the normally closed blades APl. The resistance 208 is of such a size that the closing of the relays F and R are normally delayed for a predetermined period. Thus, when a predetermined current is passing through the coil AP due to a change in speed of the motor armature, the coils F and R will remain deenergized for a predetermined time or until the motor speed approaches that for which the system has been adjusted.

The switch 186 in Figure 10 is indicated in Figure 1 as being carried in a panel at the right end of the machine and somewhat to the rear thereof. This switch is adapted for manual actuation to index the ratchet wheel 192 for adjusting the connections in the circuits of Figures 8 through 12. This control panel also mounts the operating knobs for the resistors RG and RM, the selector switches for selecting between the forward and reverse coils, the lights indicated at 188 in Figure 12 and the switch 192 by which the control circuit is reset. Thus, the entire control of the circuit is brought together in a small panel and the operator may select any predetermined speed within the range of the system in either direction of rotation, is apprized of the exact condition of the control circuit, and may reset the same at any time back to the starting point.

Figure 14:
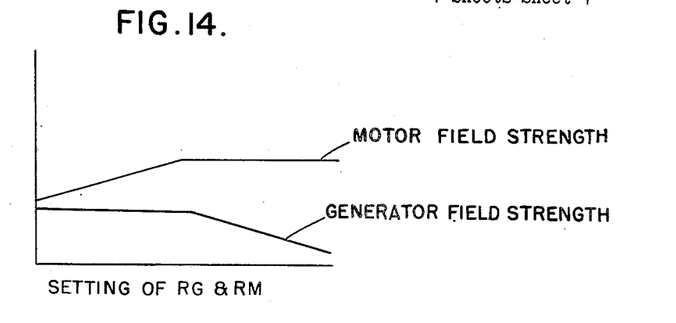
Figures 14 through 16 are graphs illustrating the conditions of the motor and generator fields, generated voltages, and the speed of the motor in relation to the setting of the rheostats shown in Figure 9.
Figure 15:
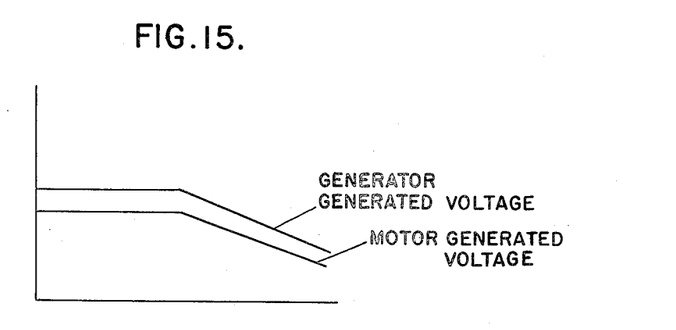
Figure 16:
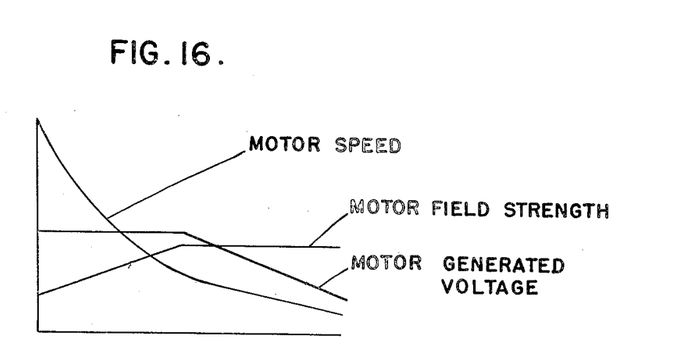

In order better to understand the operation of this invention reference may be had to the graphs of Figures 14, 15 and 16. In Figure 14 there is plotted against the setting of the resistors RG and RM the first line indicating generator field strength and a second line indicating motor field strength. It will be noted that in accordance with the arrangement shown in Figure 9, the generator field strength remains constant over the period that the motor field strength is increasing and that thereafter the motor field strength remains constant while the generator field strength is decreasing.

Inasmuch as the generator is driven by a substantially constant speed drive motor, the voltage generated thereby is substantially proportional to the generator field strength. This is indicated in Figure 15 by a line which follows substantially the same path as the generator field strength in line 14. Neglecting copper losses etc., the back E. M. F. generated by the motor will be substantially equal to the generator voltage. This is indicated by the second line in Figure 15 appropriately indicated.

If the field strength of the motor is a predetermined amount and the generator supplies a predetermined voltage to the armature thereof, then the motor speed will be such that the back E. M. F. generated therein will be substantially equal to the generator voltage. Accordingly, in Figure 16 there is plotted the motor field strength and the voltage which it will be required for the motor to generate as a back E. M. F. The third line in Figure 16 represents the motor speed and is proportional to the back E. M. F. divided by the motor field strength. It will be noted that the curve of motor speed decreases continuously toward the right of the graph indicating a continuous control of the motor speed by the small rheostats RG and RM.

*Modifications of Figures 17 and 18*

It has been explained that the switch 186 is manually operated. In Figure 17, there is shown an arrangement wherein the switch 186 is located to be struck by a cam 210 carried in the turret slide 20. When the turret 20 is fully retracted the cam 210 strikes the switch 186 and indexes the ratchet wheel to its next operative position thus automatically selecting the next feed speed.

In Figure 18, the limit switch LS1 is shown mounted on the bed 22 and arranged to be engaged by a cam 212 when the turret slide has moved a predetermined distance into the work. The switch LS1 is engaged by the cam 212 before the drive clutch in the turret mechanism apron is disengaged. The limit switch LS1 is utilized when it is desired to retract a tool, such as a tap, at a predetermined speed from the work. To this end, a limit switch LS1 would usually be employed for reversing the motor. However, the limit switch LS1 could also be utilized to modify the speed in the same direction if desired.

*Operation*

In order better to understand the operation of the present invention consider that the motor 38 is operating at a predetermined speed and that the next selected speed is considerably lower.

Then, when the switch 186 is actuated and the circuit of Figure 8 is adjusted for the new speed condition, the supply of current to the motor and generator fields will be such that the strength of the motor field relative to the generator field will be considerably increased.

Under these conditions, and with the motor armature rotating at the first speed, due to its inertia, there will be a high current passing through the coil AP. This will open the blades AP1 shown in Figure 10 and drop out the relay F or R whichever is energized. With both F and R deenergized, the blades F1 and F2 and R1 and R2 are opened to isolate the motor armature from the generator armature while the blades F3 and R3 are both closed to complete a shunt circuit around the armature through the resistors 120 and this rapidly dynamically breaks the said armature to a lower speed.

Simultaneously, the blades F5 and R5 in Figure 8 close and supply maximum current to the motor field 124 both to facilitate the aforementioned dynamic braking and to build up the motor field to its new value.

Also the blades F4 and R4 are both opened and interrupt the circuit to the generator field 122 so that the generator rotates idly and does not consume power.

When the speed of the motor armature 116 has been reduced to approximately its new speed, the relay AP drops out, permits the blades AP1 to close which energizes either F or R. Energization of either F or R interrupts the shunt connection around the motor armature, connects the motor armature with the generator armature, opens one of the blades F5, R5 and closes one of the blades F4, R4. Under these conditions normal operation of the system is resumed unless the motor armature is to be reversed or the speed thereof still further changed. If this is the case, then a high surge current will flow through the armature circuit and, by means of the coil FA pull in the blades FA1 in Figure 8 to again supply a strong field to the motor for assisting in the aforementioned speed change or reversal of the motor armature.

It will be apparent that the speed changes and reversal of the motor are accomplished in the minimum of time and, by utilizing dynamic braking, are brought about with a minimum expenditure of power.

*Modifications of Figures 19 and 20*

In Figure 19, there is shown a spindle 250 driven from a motor 252 and a feed rod 254 driven from a motor 256. The motor 252 is connected with a generator 258 that is driven from the motor 260 while the motor 256 is connected with a generator 262 also driven from the motor 260.

The fields of the motor 252 and generator 258 are controlled by a control circuit 264 identical with the one explained hereinbefore, and the fields of the motor 256 and generator 262 are similarly controlled by control circuit 266. The control circuit 264 includes a ratchet switch generally indicated at 268 in Figure 20 and the control circuit 266 includes a similar ratchet switch generally indicated at 270, in Figure 20. For synchronizing and interlocking the operation of the two control circuits, there is provided a single switch 272 which, when actuated, controls both of the indexing switches 268 and 270.

By means of the construction shown in Figures 19 and 20, it is possible to select any combination of spindle speed and tool feed in either direction. It is also possible to select a series of such speeds and feeds whereby a complete automatic cycle may be obtained with each of several tools being fed into the work at the proper speed and the spindle rotating at the proper speed and in the proper direction.

In all forms of the invention shown, the selection of motor speed and direction of rotation is made by small switches and small rheostats conveniently located adjacent the operator's position. Accordingly, this invention provides a simple and effective means for infinitely adjusting feeds and speeds in a turret lathe without employing large resistance banks. This invention also substantially eliminates complex change gear boxes and reduces the necessary gearing to not more than a few predetermined ratios.

While the invention has been shown and described in connection with a slide mechanism which is manually moved to working position and thereafter power driven into the work, it will be evident that the turret slide could be reciprocating by power throughout the cycle in both directions without departing from the teachings of this invention.

It will be understood that this invention is susceptible to modification in order to adopt it to different usages and conditions and, accordingly, it is desired to comprehend such modifications within this invention as may fall within the scope of the appended claims.

I claim:

1. In a turret lathe; a rotatable work holding spindle; a tool carrying turret and a slide supporting said turret in reciprocation to and from said spindle, said turret being indexed to its next operative position each time said slide is retracted; electric motor means to drive said spindle and slide; generator means driven from a constant speed source and connected to supply energy to said motor means; each of said generator and motor means having a field winding; thermionic rectifiers to supply rectified power to each of said generator and motor field windings; a plurality of independently adjustable resistors connected in circuit with each of the thermionic rectifiers of said generator and motor means; a switch operable to make said resistors successively effective; means responsive to the reciprocation of said slide to actuate said switch; and other switch means operable to reset said switch to its starting point.

2. In a turret lathe, a rotatable work holding spindle, an indexable turret having a given number of indexable positions, a slide supporting and journaling said turret, electric motor means to drive said spindle and said slide, generator means having a variable voltage output connected to said motor means, control means for controlling the speed of said motor means both above and below the base speed of said motor means, said control means including a separate electronic rectifier connected in circuit with each said generator and motor means, variable means connected in circuit with each said generator and motor means including a plurality of independently and manually variable resistors equal in number to said given number to vary the output of said electronic rectifiers, respectively to thereby control the speed of said motor means, means for mechanically interlinking each resistor of said generator rectifier with the corresponding resistor of said motor rectifier for simultaneous actuation, step relay means having contactors at least equal in number to the said given number of indexable positions of said turret, circuit means connecting said contactors of said step relay means with each of said mechanically interlinked pairs of resistors, and means to actuate said step relay means during the indexing of said turret to each of said index positions.

3. In a turret lathe, a rotatable work holding spindle, an indexable turret having a given number of indexable positions, a slide supporting and journaling said turret, electric motor means to drive said spindle and said slide, generator means having a variable voltage output connection to said motor means, control means for controlling the speed of said motor means both above and below the base speed of said motor means, said control means including a separate electronic rectifier connected in circuit with each said generator and motor means, variable means connected in circuit with each said generator and motor means including a plurality of independently and manually variable resistors equal in number to said given number to vary the output of said electronic rectifiers, respectively, and switch means actuated in accordance with movement of said slide for successively connecting said resistors in the circuit of said variable means.

4. In a turret lathe, a rotatable work holding spindle, a tool carrying turret and a slide supporting said turret in reciprocation to and from said spindle, said turret being indexed to its next operative position each time said slide is retracted, electric motor means to drive said spindle and slide, an armature and a field winding in said electric motor means, first and second thermionic rectifiers having a variable output and connected in circuit to control the energization to said armature and said field winding, respectively, a plurality of independently adjustable resistors connected in circuit with each of the first and second thermionic rectifiers, a switch operable to make said resistors successively effective, means responsive to the reciprocation of said slide to actuate said switch, and other switch means operable to reset said switch to its starting point.

CLAUDE E. GREENE.

REFERENCES CITED

The following references are of record in the file of this patent:

UNITED STATES PATENTS

| Number | Name | Date |
|---|---|---|
| 1,000,515 | Hanson | Aug. 15, 1911 |
| 1,193,258 | Gorman | Aug. 1, 1916 |
| 1,269,489 | Murphy | June 11, 1918 |
| 1,847,883 | Matthie | Mar. 1, 1932 |
| 2,129,280 | Lange et al. | Sept. 6, 1938 |
| 2,255,739 | Curtis | Sept. 9, 1941 |
| 2,264,804 | Lovely | Dec. 2, 1941 |
| 2,289,957 | Godfriaux | July 14, 1942 |
| 2,315,511 | Elberty | Apr. 6, 1943 |
| 2,384,809 | Bullard et al. | Sept. 18, 1945 |
| 2,405,686 | Clark | Aug. 13, 1946 |
| 2,427,493 | Bullard et al. | Sept. 16, 1947 |